(12) United States Patent
Holifield et al.

(10) Patent No.: US 10,016,336 B2
(45) Date of Patent: *Jul. 10, 2018

(54) CARDIOPULMONARY RESUSCITATION (CPR) FEEDBACK SYSTEMS AND METHODS

(71) Applicants: NuLine Sensors, LLC, Sanford, FL (US); Schiller AG, Baar (CH)

(72) Inventors: Timothy A. Holifield, Eustis, FL (US); Jonathan R. Mohlenhoff, Longwood, FL (US); Rolf Schuler, Hedingen (CH); Benjamin M. Downey, Sanford, FL (US); Johann-Jakob Schmid, Rifferswil (CH); Michael J. Vosch, Titusville, FL (US)

(73) Assignee: NuLine Sensors, LLC, Lake Mary, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/593,518

(22) Filed: May 12, 2017

(65) Prior Publication Data

US 2017/0246078 A1 Aug. 31, 2017

Related U.S. Application Data

(63) Continuation of application No. 14/676,749, filed on Apr. 1, 2015, now Pat. No. 9,675,517.

(60) Provisional application No. 61/973,478, filed on Apr. 1, 2014.

(51) Int. Cl.
*A61H 31/00* (2006.01)
*H04Q 9/00* (2006.01)

(52) U.S. Cl.
CPC ........ *A61H 31/005* (2013.01); *A61H 31/007* (2013.01); *H04Q 9/00* (2013.01); *A61H 2201/5012* (2013.01); *A61H 2201/5015* (2013.01); *A61H 2201/5061* (2013.01); *A61H 2201/5064* (2013.01); *A61H 2201/5069* (2013.01); *A61H 2201/5084* (2013.01); *A61H 2201/5097* (2013.01); *H04Q 2209/30* (2013.01); *H04Q 2209/40* (2013.01); *H04Q 2209/43* (2013.01)

(58) Field of Classification Search
None
See application file for complete search history.

(56) References Cited

U.S. PATENT DOCUMENTS

| | | | |
|---|---|---|---|
| RE44,187 E | 4/2013 | Marcovecchio et al. | |
| 2002/0055694 A1* | 5/2002 | Halperin ............ | A61B 5/04017 601/41 |

(Continued)

OTHER PUBLICATIONS

Final Office Action received in U.S. Appl. No. 14/676,749 dated Oct. 26, 2016.

(Continued)

*Primary Examiner* — Joseph Feild
*Assistant Examiner* — John Mortell
(74) *Attorney, Agent, or Firm* — Olive Law Group, PLLC

(57) ABSTRACT

Systems and methods for cardiopulmonary resuscitation feedback are disclosed. According to an aspect, a method includes determining a force. The method also includes, in response to determining the force, acquiring spatial orientation data, remove the effects of gravity, and wirelessly or wired method of communicating the spatial orientation data.

18 Claims, 7 Drawing Sheets

(56) References Cited

U.S. PATENT DOCUMENTS

| | | | |
|---|---|---|---|
| 2008/0214963 A1* | 9/2008 | Guillemaud | A61B 5/0205 600/595 |
| 2010/0022904 A1 | 1/2010 | Centen | |
| 2010/0234908 A1 | 9/2010 | Didon | |
| 2011/0034836 A1 | 2/2011 | Halperin et al. | |
| 2011/0092864 A1 | 4/2011 | Woerlee et al. | |
| 2012/0191014 A1 | 7/2012 | Fossan | |
| 2013/0030326 A1* | 1/2013 | Bogdanowicz | A61H 31/007 600/587 |
| 2015/0088016 A1* | 3/2015 | Fleischacker | A61N 1/3925 600/510 |

OTHER PUBLICATIONS

Notice of Allowance received in U.S. Appl. No. 14/676,749 dated Feb. 9, 2017.

Office Action received in U.S. Appl. No. 14/676,749 dated Jun. 21, 2016.

PCT Search Report and Written Opinion for PCT International Application No. PCT/US2015/023950 dated Aug. 3, 2015.

Shrier et al.; "Can a Rescuer or Simulated Patient Accurately Assess Motion During Cervical Spine Stabilization Practice Sessions?" Journal of Athletic Training 2012, vol. 47(1) pp. 42-51.

Van de Vel et al.; "Non-EEG seizure-detection systems and potential SUDEP prevention: State of the art" Seizure (2013), vol. 22 pp. 345-355.

Non-Final Office action dated Jun. 21, 2016 from related U.S. Appl. No. 14/676,749.

Response as filed to the Non-Final Office action dated Jun. 21, 2016 from related U.S. Appl. No. 14/676,749.

Final Office action dated Oct. 26, 2016 from related U.S. Appl. No. 14/676,749.

Response as filed Final Office action dated Oct. 26, 2016 from related U.S. Appl. No. 14/676,749.

Supplemental European Search Report issued in counterpart EP Application No. 15773841.0 dated Oct. 20, 2017.

\* cited by examiner

CARDIOPULMONARY RESUSCITATION (CPR) FEEDBACK SYSTEMS AND METHODS

CROSS REFERENCE TO RELATED APPLICATION

The application claims the benefit of and priority to U.S. patent application Ser. No. 14/676,749, filed Apr. 1, 2015 and titled CARDIOPULMONARY RESUSCITATION (CPR) FEEDBACK SYSTEMS AND METHODS; which claims benefit of and priority to U.S. Provisional Patent Application No. 61/973,478, filed Apr. 1, 2014 and titled CARDIOPULMONARY RESUSCITATION (CPR) FEEDBACK SYSTEMS AND METHODS; the entire content of which is incorporated herein by reference in its entirety.

TECHNICAL FIELD

The presently disclosed subject matter relates to medical equipment. Particularly, the presently disclosed subject matter relates to cardiopulmonary resuscitation (CPR) feedback systems and methods.

BACKGROUND

CPR is an emergency procedure performed in an effort to manually preserve intact brain function until further measures can be performed to restore spontaneous blood circulation and breathing in a person who is in cardiac arrest. It is indicated in persons who are unresponsive with no breathing or abnormal breathing, for example, agonal respirations.

CPR quality may be improved by use of various equipment. For example, CPR feedback equipment may provide medical personnel with feedback information for improving their CPR performance. Various timing devices have been developed for assisting a rescuer in achieving the correct rate. Some units can also provide timing reminders for performing compressions, ventilating, and changing operators. Some other automated devices have been made available that can take over the chest compressions for the rescuer.

Despite advances, there is a continuing need for improved CPR feedback systems and methods.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Systems and methods for cardiopulmonary resuscitation feedback are disclosed. According to an aspect, a method includes determining a force. The method also includes, in response to determining the force, acquiring spatial orientation data, remove the effects of gravity, and wirelessly or wired method of communicating the spatial orientation data.

BRIEF DESCRIPTION OF THE DRAWINGS

The foregoing summary, as well as the following detailed description of various embodiments, is better understood when read in conjunction with the appended drawings. For the purposes of illustration, there is shown in the drawings exemplary embodiments; however, the presently disclosed subject matter is not limited to the specific methods and instrumentalities disclosed. In the drawings.

DETAILED DESCRIPTION

The presently disclosed subject matter is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Figure 1:
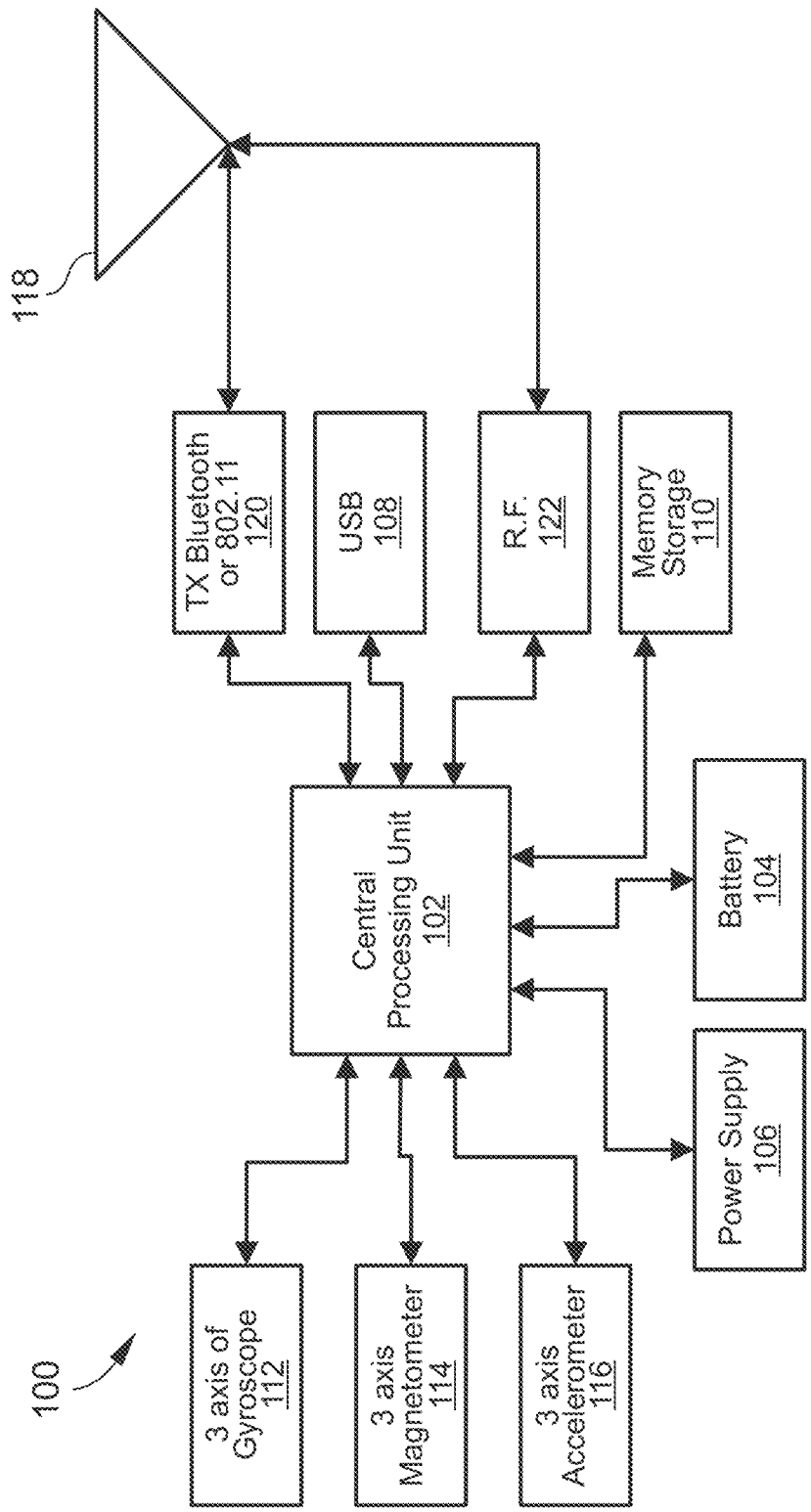
FIG. 1 is a block diagram of a CPR feedback system in accordance with embodiments of the present subject matter.

FIG. 1 illustrates a block diagram of a CPR feedback system 100 in accordance with embodiments of the present subject matter. Referring to FIG. 1, the system includes a central processing unit (CPU) 102 that is operatively connected to multiple components as shown. Although, it should be understood that the CPU 102 may be implemented with any other suitable hardware, software, or firmware, and may be operatively connected with any other suitable components that are not shown as will be understood by those of skill in the art. The CPU 102 may execute multiple instructions for implementing the functionality described herein. It should also be understood that the CPU 102 may work together with one or more other suitable electronic components for implementing the functionality described herein as will be understood by those of skill in the art.

The system 100 may include a battery 104 and/or another power supply 106 as will be understood by those of skill in the art for providing power to the CPU 102. The battery 104 and/or power supply 106 may also suitably supply power to other components of the system 100 that are shown in the figure or other components that are not shown. The system 100 may include a universal serial bus (USB) interface 108 for operative connection to a USB-enabled device. In an example, the system 100 may derive power from the USB-enabled device that is operatively connected to the USB interface 108. Further, the USB-enabled device and the system 100 may exchange data via the USB interface via a suitable USB communications technique. The USB-enabled device may be a suitable computing device such as, but not limited to, a mobile computing device (e.g., a laptop computer, a smartphone, or a tablet computer).

The system 100 may include a memory storage 110 for storing instructions for the CPU or other data for implementing the functionality described herein. The CPU 102 and memory storage 110 may be operatively configured to function together such that the CPU 102 can access instructions and other data stored in the memory storage 110 for implementing the functionality described herein.

The system 100 may include a gyroscope 112, a magnetometer 114, and an accelerometer 116. Alternatively, the system may include any combination of these types of sensors and/or other sensors of any suitable type for implementing the functionality described herein. The gyroscope 112 can measure orientation of the system 100 or a device in which the system is implemented. The magnetometer 114 is configured to measure the magnetization of a magnetic material, such as a ferromagnet, or to measure the strength and/or direction of the magnetic field at a point in space where the system 100 is located. The accelerometer 116 can measure proper acceleration of the system 100 or a device in which the system 100 is implemented. After acquiring measurements, these components may suitably communicate all or a portion of the measurement data to the CPU 102 for processing or to the memory storage 110 for storage.

As an example, the measurement data collected by the gyroscope 112 and/or magnetometer 114 may be read into the CPU 102 for use in determining spatial orientation. The CPU 102 may implement instructions for determining spatial orientation based on the collected measurement data. Subsequently, the CPU 102 may access and read the accelerometer data for force and depth determinations. Further, the CPU 102 may suitably process and prepare collected data for transmission as will be described in further detail. The CPU 102 may determine whether the collected data is to be transmitted. If it is determined that there is to be no transmission of the data, the CPU 102 may store the data in the memory storage 110 for later retrieval.

With continuing reference to FIG. 1, the system 100 may include suitable components for wirelessly transmitting collected data and other information in accordance with embodiments of the present subject matter. For example, the system 100 may include an antenna 118 that is operatively configured with a transmitter 120. The CPU and storage memory may suitably implement instructions for controlling the transmitter 120 and antenna 118 for communicating data and other information. For example, the system 100 may include any suitable type of radiofrequency (RF) transmission component 122 for receiving data and information from the CPU 102 for transmission by the antenna 118. Further, for example, the transmitter 120 may be a suitable BLUETOOTH®-enabled component and/or IEEE 802.11-enabled component for transmission of data.

Figure 2:
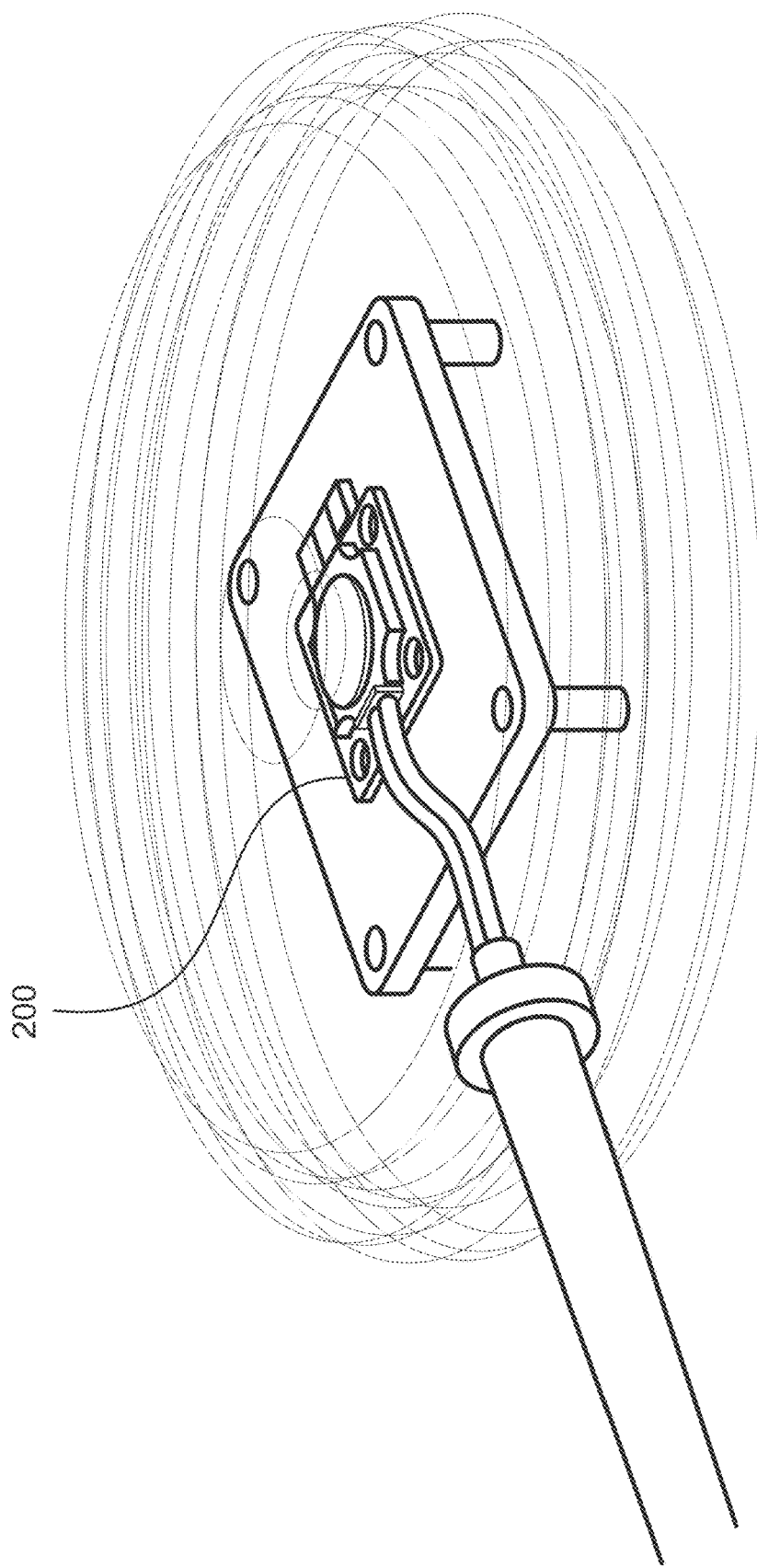
FIG. 2 is a perspective view of a system in accordance with embodiments of the present subject matter.

FIG. 2 illustrates a perspective view of an example system in accordance with embodiments of the present subject matter. Referring to FIG. 2, the system is shown as being implemented on a suitable circuit board.

Figure 3:
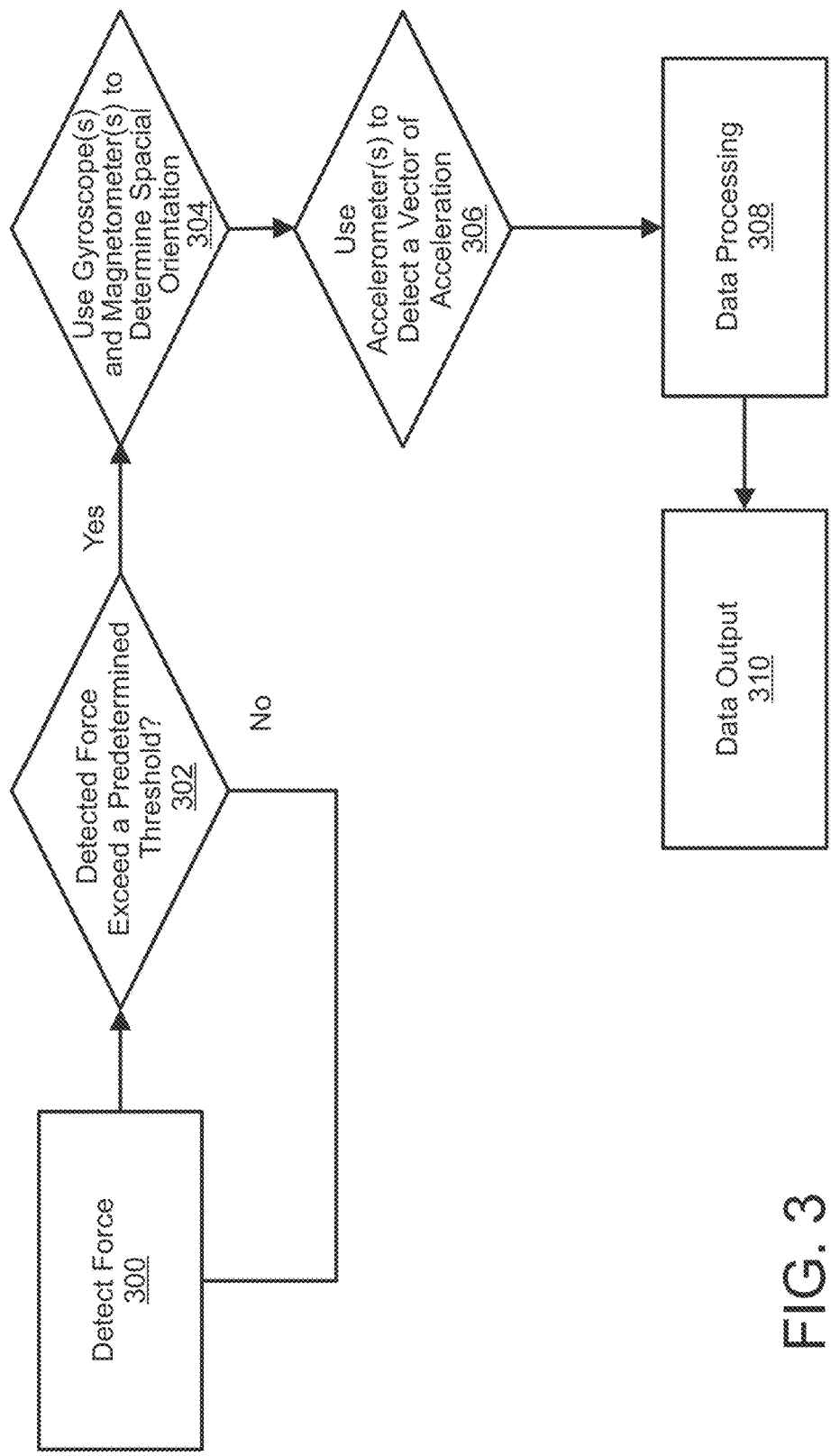
FIG. 3 is a flowchart of an example method for CPR feedback in accordance with embodiments of the present subject matter.

FIG. 3 illustrates a flowchart of an example method for CPR feedback in accordance with embodiments of the present subject matter. The method of FIG. 3 is described as being implemented by the system 100 shown in FIG. 1 in this example; however, it should be understood that the method may alternatively be implemented by any other suitable system.

Referring to FIG. 3, the method includes detecting 300 a force. For example, a force sensor, such as the accelerometer 116 shown in FIG. 1, may be activated when a force is exerted on the system 100. After detecting the force, the accelerometer 116 may communicate a signal indicating the detection to the CPU 102. Force measurements may be suitably processed by the CPU 102 and stored in memory storage 110 or any other suitable memory components.

The method of FIG. 3 includes determining 302 whether a magnitude of the detected force exceeds a predetermined threshold. Continuing the aforementioned example, the CPU 102 may execute a loop for detection of the force and remain in the loop until a force is detected that exceeds a predetermined threshold. For example, if it is determined that the detected force does not exceed the threshold, the method returns to step 300. If the detected force exceeds the threshold, the method proceeds to step 304. The force sensor (e.g., accelerometer 116) may continuously or periodically measure force and communicate the measurements to the CPU 102 for determining whether the threshold is exceeded.

Subsequent to detection of the force, the method of FIG. 3 includes detecting spatial orientation. For example, the method of FIG. 3 includes using 304 one or more gyroscopes and magnetometers to determine spatial orientation. Continuing the aforementioned example, the gyroscope 112 and the magnetometer 114 shown in FIG. 1 may acquirement measurement data and communicate the measurement data to the CPU 102. The data may be stored in the memory storage 110. The CPU 102 may use the acquired data to determine a spatial orientation and remove the effects of gravity of the system 100.

With continuing reference to FIG. 3, the method includes using 306 one or more accelerometers to detect a vector of acceleration. Continuing the aforementioned example, the accelerometer 116 shown in FIG. 1 may detect a vector of acceleration and communicate the data to the CPU 102. The acquired data may be stored in the memory storage 110. The CPU 102 may measure the accelerometer 116 to determine vector of acceleration. The CPU may use the acquired data in accordance with functionality described herein.

The method of FIG. 3 may include data processing 308. Continuing the aforementioned example, in summary in response to determining that the force exceeds a predetermined threshold as determined in step 302, spatial orientation and acceleration vector data is determined and used for data processing. Such data may be collected each time a force is detected that exceeds the threshold. Further, the system 100 may include high pass filters or other hardware, and/or suitable data processing techniques to smooth the raw data into usable form as will be understood to those of skill in the art. Further, the CPU 102 may verify the data and suitably prepare the data for transmission.

The method of FIG. 3 includes outputting 310 the data. For example, acquired and/or processed data may be communicated to one or more other computing devices. The data may be wirelessly communicated to another computing device. Continuing the aforementioned example, the system 100 of FIG. 1 may wirelessly transmit the data. The data may be suitably communicated by use of the transmitter 120, RF 122, and/or antenna 118 as will be understood by those of skill in the art.

Figure 4:
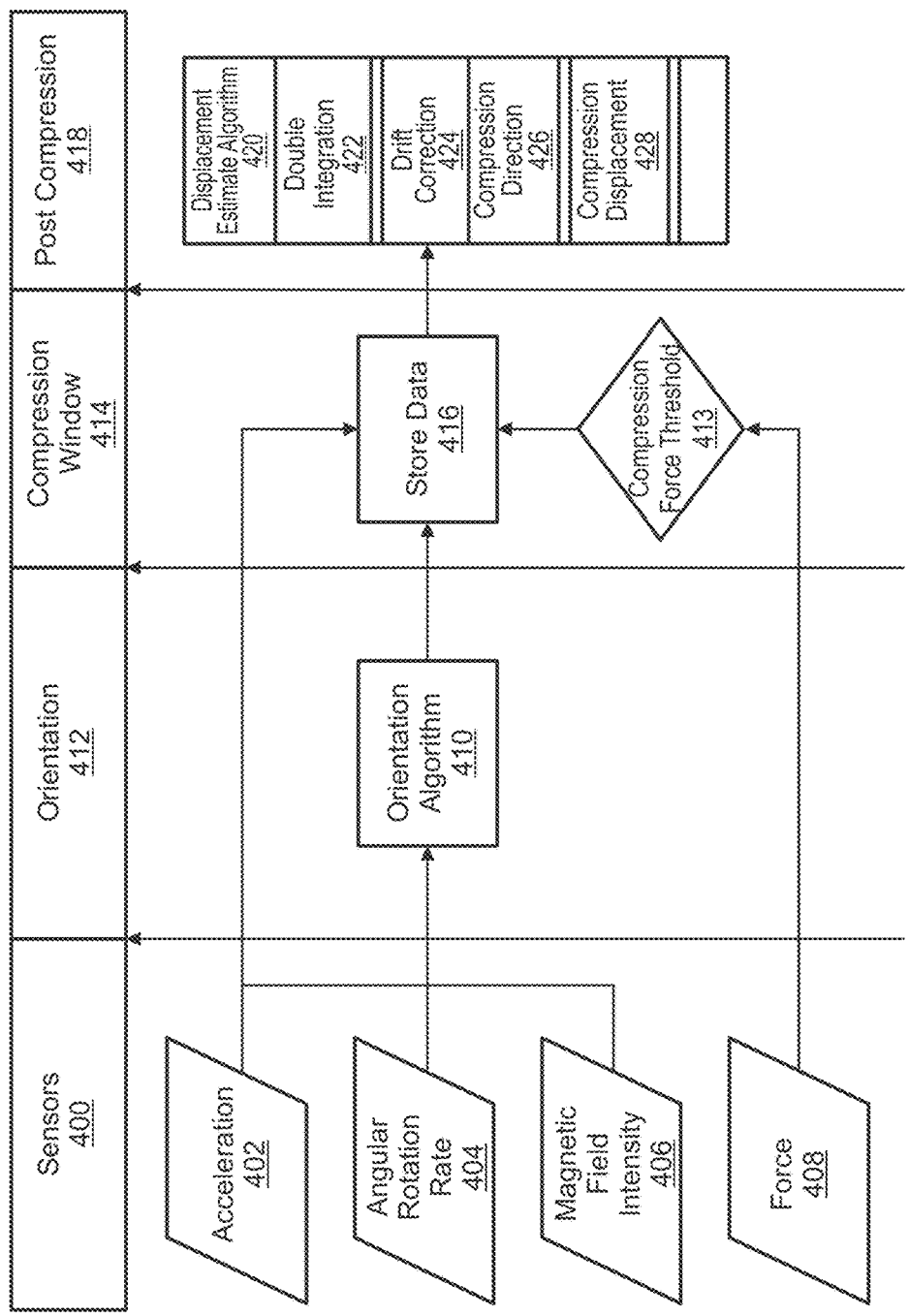
FIG. 4 is a flow diagram for implementing an example method for CPR feedback.

In accordance with embodiments of the present disclosure, FIG. 4 illustrates a flow diagram for implementing an example method for CPR feedback. Referring to FIG. 4, various sensors 400 may be included within a system, such as the system 100 shown in FIG. 1. In this example, the sensors 400 may be controlled to obtain the measurements of acceleration 402, angular rotation rate 404, magnetic field intensity 406, and force 408. Acceleration rate, angular rotation rate, and magnetic field intensity may be obtained on 3-axis at a suitable rate (e.g., about 500 Hz). The sensors 400 may also obtain other measurements. Example sensors for obtaining the measurements include, but are not limited to, a gyroscope, a magnetometer, and accelerometer, and the like. The data may be suitably stored. In an example, the CPU 102 shown in FIG. 1 may receive the measurement data and implement the functionality of FIG. 4. Further, other components of the system 100 shown in FIG. 1 may be suitably used for implementing the functionality of FIG. 4.

The method of FIG. 4 may include applying an orientation algorithm 410 for determining an orientation 412 of a system, such as the system 100 shown in FIG. 1. In an example, the orientation algorithm may be implemented by the CPU 102 that is processing instructions from the memory storage 110. The CPU 102 may obtain the measurements of acceleration, angular rotation rate, and magnetic field intensity from the sensors 400. The measurements may be used in the orientation algorithm 410. In an example, the orientation algorithm 410 may be continuously computed using acceleration, angular rotation, and magnetic field intensity to estimate the system or device's orientation in three-dimension (3D) space (e.g., Earth's north, east and down).

With continuing reference to FIG. 4, the measured force 408 may be used to identify the start and end of a compression cycle by comparing 413 against threshold trigger points. For example, the measurements obtained by a force sensor may be obtained and used by the CPU 102 shown in FIG. 1 for determining the compression cycle. Within a compression cycle or window 414, the acceleration in a global reference frame may be stored 416 in the memory storage 110 and processed post compression event.

The method of FIG. 4 includes applying a post compression algorithm 418. The post compression algorithm 418 may be a displacement estimate algorithm 420 including double integrating acceleration 422 in all three axes to obtain position with drift correction 424. Further, the algorithm 418 may include estimating compression direction 426 by computing the maximum magnitude of displacement of the compression window. The algorithm 418 may include projecting 3-axis globally referenced position data to the compression direction 426 and computing the compression displacement estimate 428 invariant to body orientation and compression rotation.

Figure 5A:
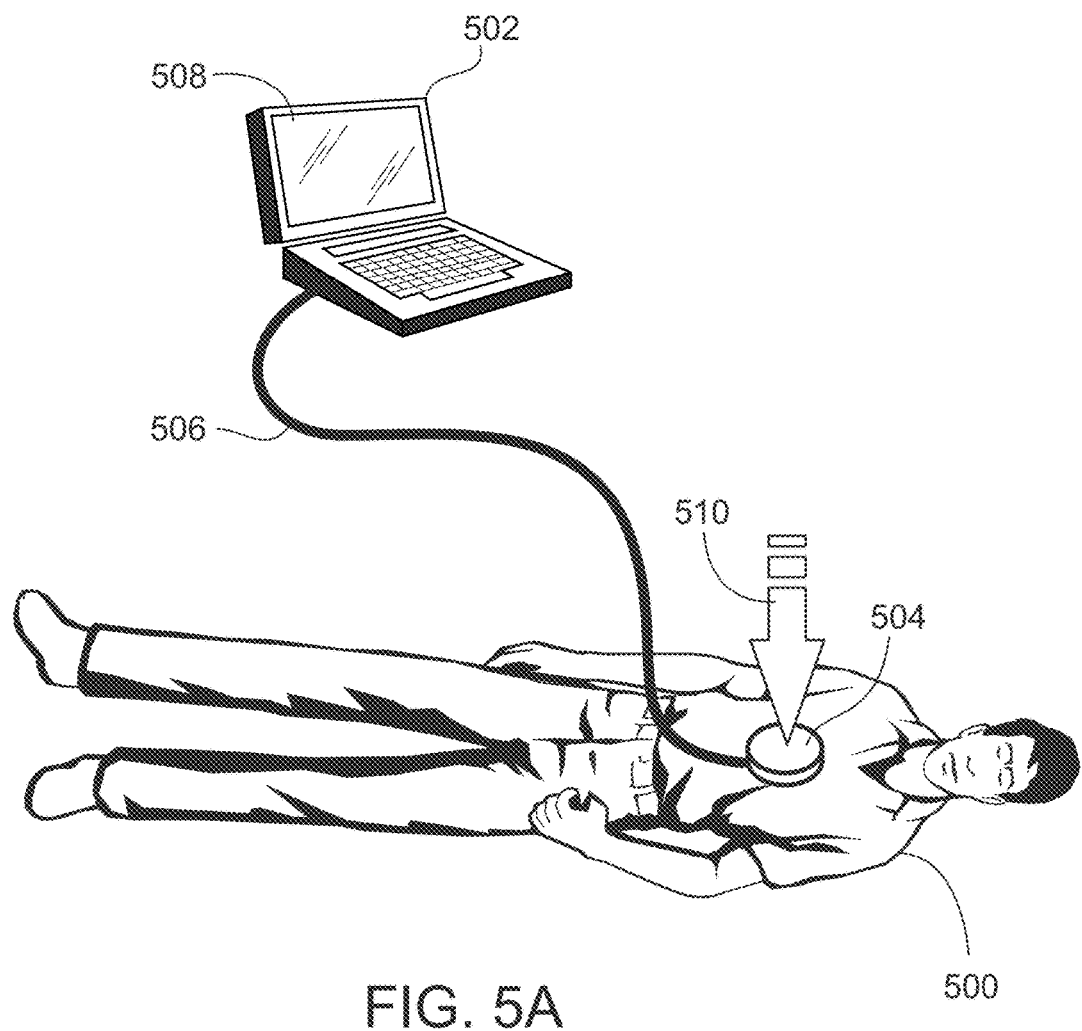
FIG. 5A is a perspective view depicting an operational environment of an example system for providing CPR feedback in accordance with embodiments of the present disclosure.

FIG. 5A illustrates a perspective view depicting an operational environment of an example system for providing CPR feedback in accordance with embodiments of the present disclosure. It is noted that the system may implement some or all of the functionality described herein and include components for implementing such functionality as described herein. In this example, the system is shown in operation as being applied to a person or subject 500 in a horizontal position. It is noted that the subject 500 is shown in a completely horizontal position, but it should be understood that the subject 500 may be in any suitable position such that CPR may be applied by another. As an example, the subject 500 may be in a sitting position.

Now referring to FIG. 5A, the system may include a computing device 502 and a CPR device 504. A cable 506 may communicatively connect the computing device 502 and the CPR device 504. In this example, the computing device 502 is a laptop computer, although it should be understood that the computing device 502 may be any other suitable computing device such as, but not limited to, a tablet computer or a smartphone. The cable may be in accordance with USB standards.

The CPR device 504 may include, for example, some or all of the components of the system 100 shown in FIG. 1 for implementing functionality in accordance with embodiments of the present disclosure. The computing device 502 may include a display 508 for displaying graphics or text for visualization of CPR compressions. During CPR, compressions to the chest of the subject 500 may be made directly or substantially in the direction indicated by arrow 510. The compressions may be made through the CPR device 504 to the chest of the subject 500. The force of the compressions may be measured in accordance with embodiments of the present disclosure. In addition, for example, the CPR device 504 may measure special orientation and vector of acceleration in accordance with embodiments of the present disclosure. Such information may be processed and presented via the display 508 for providing CPR feedback information to an administrator of CPR to the subject 500 while CPR is being performed.

Figure 5B:
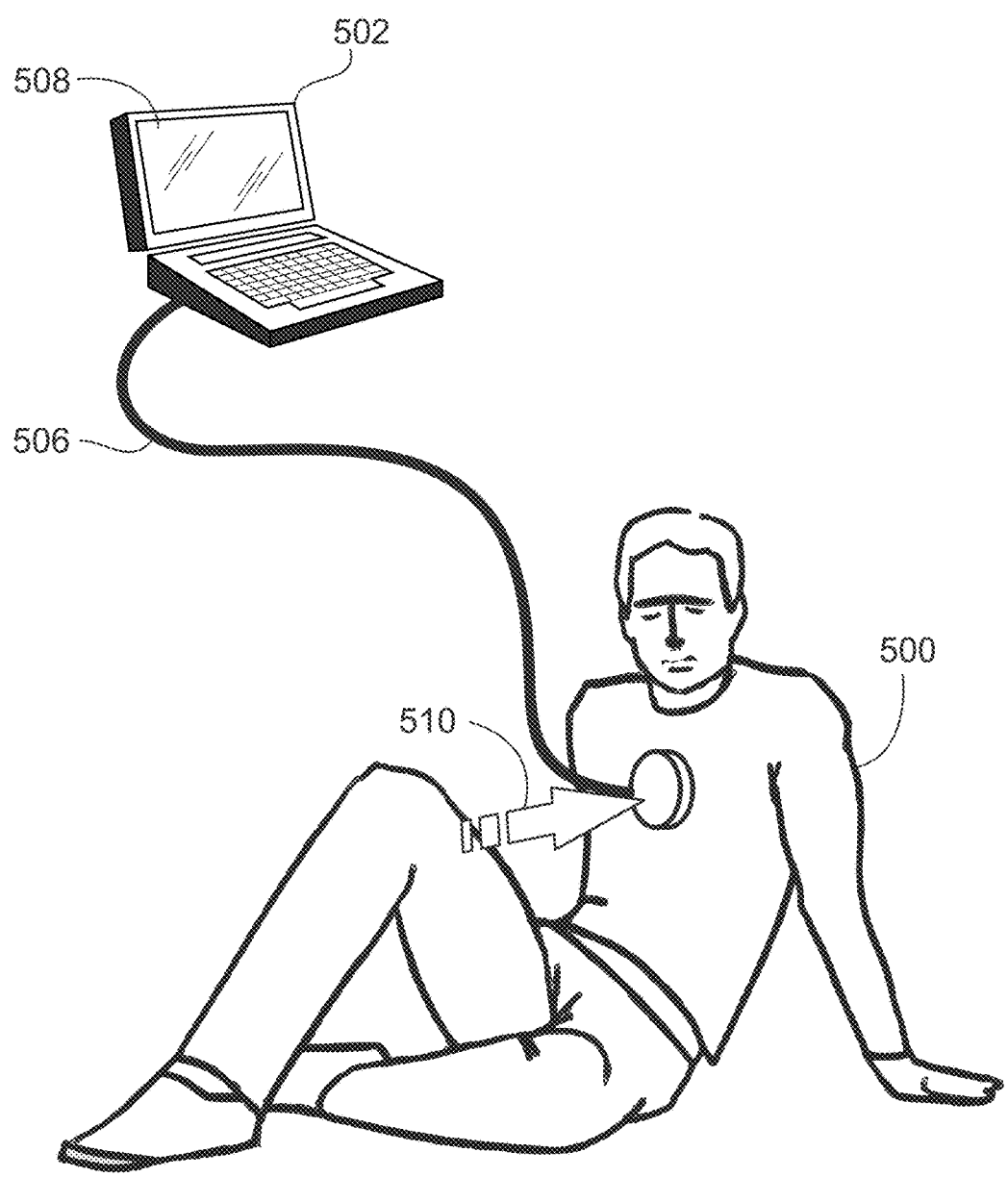
FIG. 5B is a perspective view depicting an operational environment of an example system for providing CPR feedback with a subject sitting upright in accordance with embodiments of the present disclosure.

FIG. 5B illustrates a perspective view depicting an operational environment of an example system for providing CPR feedback with a subject sitting upright in accordance with embodiments of the present disclosure. This figure depicts an environment and system that is the same as FIG. 5A except that the person is sitting upright while CPR is administered.

Figure 6:
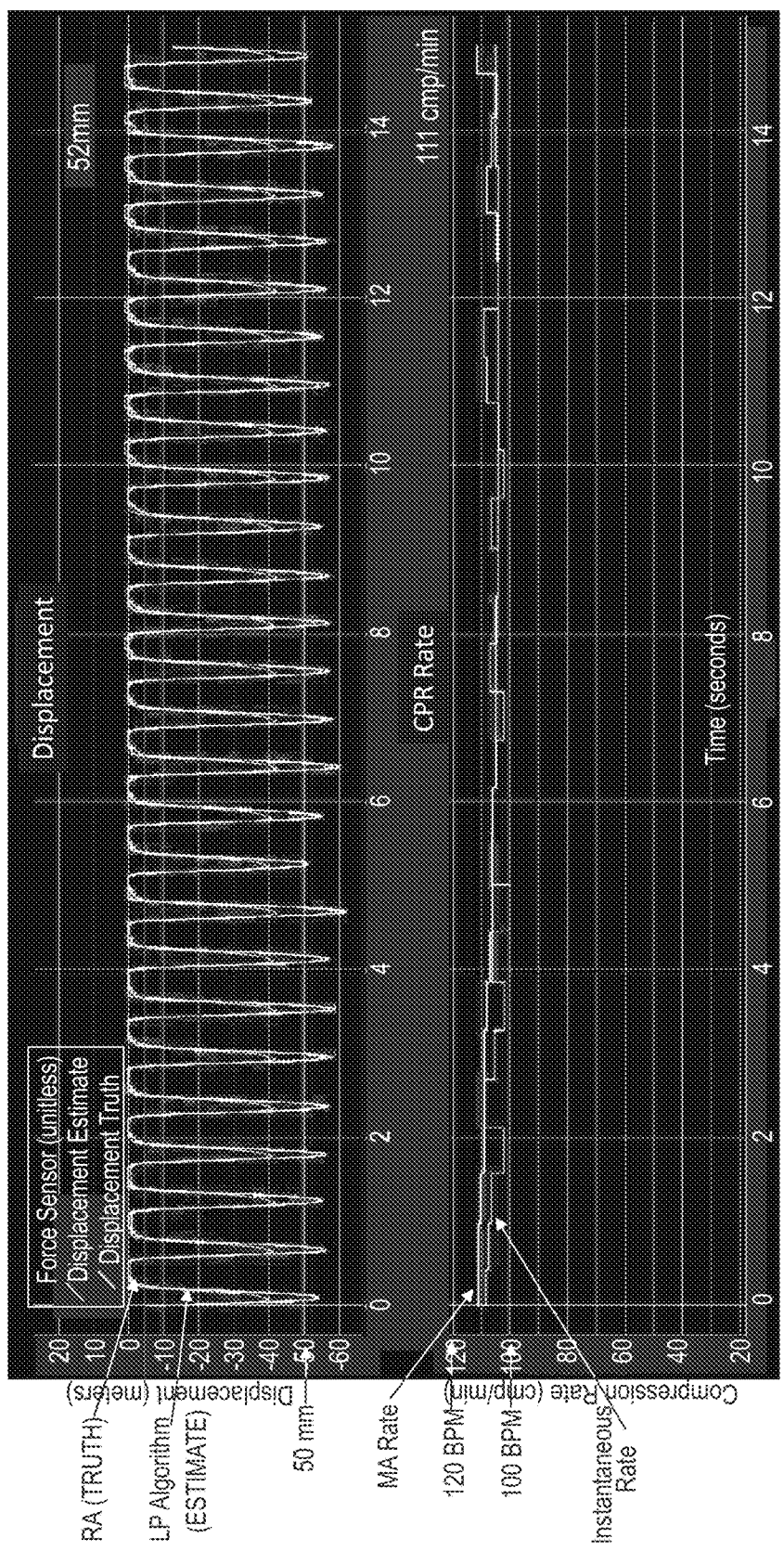
FIG. 6 illustrates an image showing an example display of CPR feedback in accordance with embodiments of the present disclosure.

FIG. 6 illustrates an image showing an example display of CPR feedback in accordance with embodiments of the present disclosure. Referring to FIG. 6, a top portion shows the displacement and a bottom portion shows the CPR rate.

Systems in accordance with the present disclosure may include a variety of features such as, but not limited to, waterproof sensors, ergonomically shaped sensors, and USB connection for power and data. Further, systems may obtain measurement data such as, but not limited to, compression depth and rate and chest recoil for insuring proper chest compression.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A method comprising:
    at a computing device of a cardiopulmonary resuscitation (CPR) feedback system:
        obtaining measurement data from one or more sensors in the CPR feedback system;
        determining orientation data in three-dimension (3D) space based on the measurement data;
        calculating post compression information by applying a post compression algorithm to the orientation data in the 3D space, wherein the post compression algorithm calculates a compression displacement estimate invariant to a body orientation and a compression rotation, and wherein the post compression algorithm projects three-axis global referenced position data to a compression direction; and
        presenting the post compression information on a display device of the CPR feedback system.

2. The method of claim 1, wherein the measurement data comprises one of measurements of acceleration, angular rotation rate, magnetic field intensity, and force.

3. The method of claim 1, wherein the one or more sensors comprises one of a gyroscope, a magnetometer, and an accelerometer.

4. The method of claim 1, wherein determining the orientation data based on the measurement data comprises estimating an orientation of the CPR feedback system in the 3D space.

5. The method of claim 1, further comprising identifying a start and an end of a compression cycle in the CPR feedback system.

6. The method of claim 5, wherein identifying the start and end of the compression cycle comprises comparing the measurement data to a predetermined threshold.

7. The method of claim 6, wherein the measurement data comprises a measurement of a force exerted on the CPR feedback system.

8. The method of claim 1, wherein the post compression algorithm calculates a position with drift correction by double integrating acceleration data in three-dimension (3D) space.

9. The method of claim 1, wherein the post compression algorithm calculates a compression direction by computing the maximum magnitude of displacement of a compression window.

10. A system comprising:
a cardiopulmonary resuscitation (CPR) feedback device configured to:
obtain measurement data from one or more sensors in a CPR feedback system;
determine orientation data in three-dimensional (3D) space based on the measurement data;
calculate post compression information by applying a post compression algorithm to the orientation data in 3D space, wherein the post compression algorithm calculates a compression displacement estimate invariant to a body orientation and a compression rotation, and wherein the post compression algorithm projects three-axis global referenced position data to a compression direction; and
a display device configured to present the post compression information.

11. The system of claim 10, wherein the measurement data comprises one of measurements of acceleration, angular rotation rate, magnetic field intensity, and force.

12. The system of claim 10, wherein the one or more sensors comprises one of a gyroscope, a magnetometer, and an accelerometer.

13. The system of claim 10, wherein the CPR feedback device is configured to determine the orientation data by estimating an orientation of the CPR feedback system in three-dimension (3D) space.

14. The system of claim 10, the CPR feedback device further configured to identify a start and an end of a compression cycle in the CPR feedback system.

15. The system of claim 14, wherein the CPR feedback devices is configured to identify the start and end of the compression cycle by comparing the measurement data to a predetermined threshold.

16. The system of claim 15, wherein the measurement data comprises a measurement of a force exerted on the CPR feedback system.

17. The system of claim 10, wherein the post compression algorithm calculates a position with drift correction by double integrating acceleration data in the 3D space.

18. The system of claim 10, wherein the post compression algorithm calculates a compression direction by computing the maximum magnitude of displacement of a compression window.

* * * * *